M. POUGET.
SPEED CHANGING POWER TRANSMISSION DEVICE.
APPLICATION FILED OCT. 18, 1919.
1,387,070.
Patented Aug. 9, 1921.
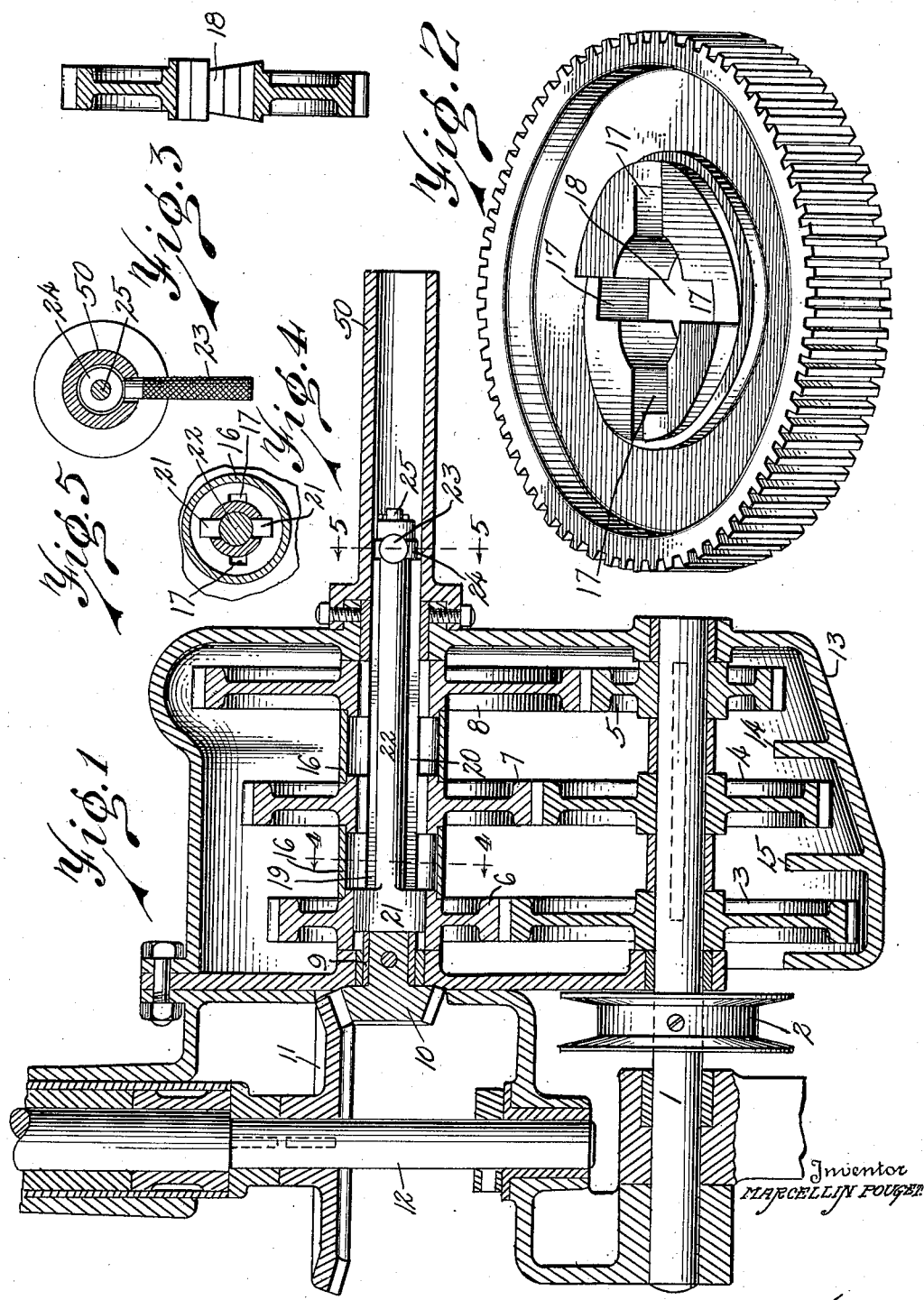

M. POUGET.
SPEED CHANGING POWER TRANSMISSION DEVICE.
APPLICATION FILED OCT. 18, 1919.
1,387,070.
Patented Aug. 9, 1921.
2 SHEETS—SHEET 2.
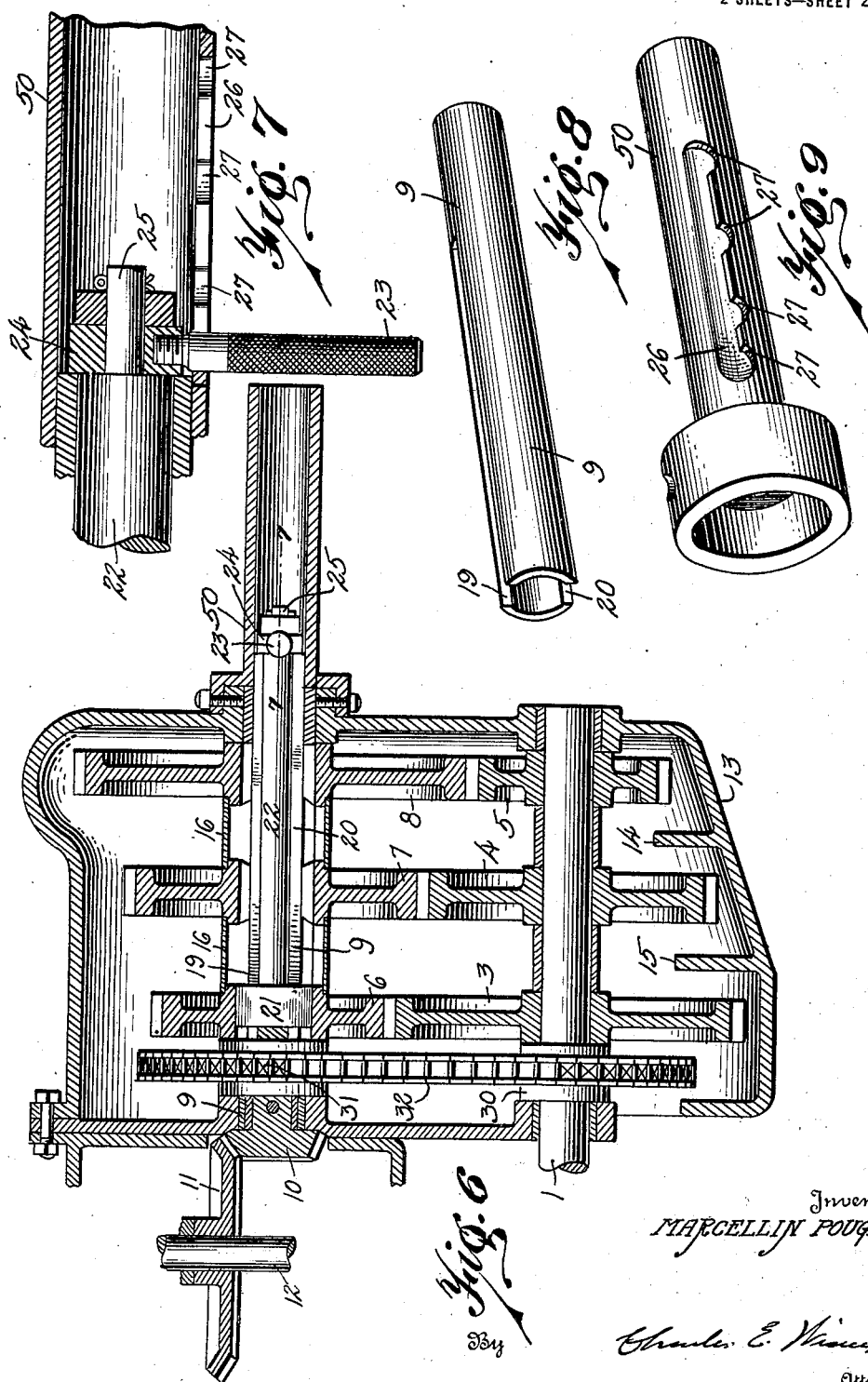

UNITED STATES PATENT OFFICE.

MARCELLIN POUGET, OF DETROIT, MICHIGAN.

SPEED-CHANGING POWER-TRANSMISSION DEVICE.

1,387,070.　　　　Specification of Letters Patent.　　Patented Aug. 9, 1921.

Application filed October 18, 1919. Serial No. 331,578.

*To all whom it may concern:*

Be it known that I, MARCELLIN POUGET, a citizen of the Republic of France, residing at Detroit, county of Wayne, State of Michigan, have invented a certain new and useful Improvement in Speed-Changing Power-Transmission Devices, and declare the following to be a full, clear, and exact description of the same, such as will enable others skilled in the art to which it pertains to make and use the same, reference being had to the accompanying drawings, which form a part of this specification.

This invention relates to speed-changing power transmission devices, and its object is to provide a simple and efficient device for operation of various mechanisms where change of speed may be desired between the driving and driven elements, the object being to provide a device in which the gears utilized in the variation of speed of operation and maintained continuously in mesh whereby the change from one gear to another may be made without clashing of the gears. To this end the gears are revolubly mounted upon a shaft and a sliding key provided movable in the shaft from one to the other of the gears to fix the same to the shaft to cause rotation thereof. A feature of this invention is involved in the construction of the gear hub permitting the movement of the key therethrough and of the engagement of the key therewith without particular shock, the construction being such as to permit introduction of the key readily. These and other objects and the several novel features of the invention in its preferred form are hereinafter more fully described and claimed and shown in the accompanying drawings in which—

Figure 1 is a vertical section of a power transmission device embodying my invention.

Fig. 2 is a detail in perspective of one of the gears showing the peculiar hub construction.

Fig. 3 is a vertical section of a gear on a small scale.

Fig. 4 is a section taken on line 4—4 of Fig. 1.

Fig. 5 is a section taken on line 5—5 of Fig. 1.

Fig. 6 is a section similar to that of Fig. 1 showing a reverse gear in conjunction with the various gears for forward speed.

Fig. 7 is a section taken on line 7—7 of Fig. 6.

Fig. 8 is a detail in perspective of the gear shaft.

Fig. 9 is a detail in perspective of a housing utilized at the end of the gear shaft and showing the means employed to position the key at any desired point.

The preferred form of construction is shown in Figs. 1 and 6 Fig. 1 being the type of power transmission device in which all speeds may be termed forward speeds and that in Fig. 6 showing in addition thereto a reverse gear and in either case the gears are continuously running gears. Preferably the mechanism consists of what I have termed a driving shaft 1 which may be driven in any approved manner by means of a belt wheel 2 thereon. On this shaft is keyed a series of gears, 3, 4 and 5 of varying diameters as shown and the number of gears so keyed to the shaft may be greater or less in number than is here shown. Meshing with these gears respectively are gears 6, 7 and 8 ranging from small to large diameter. These last named gears are rotatably mounted on a shaft 9 which shaft is to be connected with the apparatus to be driven. This connection with the apparatus to be driven may be of any well known form and is here shown as a beveled pinion 10 secured to the shaft 9 and meshing with the complemental bevel gear 11 on the load shaft 12. The pairs of gears 3 and 6, 4 and 7, and 5 and 8 are supported within a housing 13 having a series of upwardly extending partition walls 14 and 15 between the gears 3 and 4 and 4 and 5 providing oil retaining pockets into which the gears extend at the bottom as is commonly the practice in such mechanism. The housing 13 is provided with bearings for the shaft 1 and shaft 9 and the end of the shaft 9 opposite the gear 10 extends into a tubular housing 50 provided therefor and secured to the hub of the bearing for the shaft as shown in Figs. 1 and 9.

As heretofore stated the gears 6, 7 and 8 are rotatably mounted on the shaft 9 and are held in spaced relation by the tubular spacers 16 engaging over the hubs of the gears as will be readily understood. These gears are provided with keyways 17 extending outwardly from the central aperture 18 in which the shaft 9 engages as will be understood from Fig. 2. Briefly there are four such keyways arranged in diametrically opposite relation as shown. The hub of each gear 6, 7 and 8 extends equidistantly on opposite sides of the center plane of the wheel and the face of the hub is cut to form as shown clearly in Fig. 2 and somewhat similar to a jaw clutch being tapered from a high point at one side of one keyway 17 to a low point adjacent the same side of the next succeeding keyway 17, the purpose of which is to enable the key hereafter described to be moved into the keyways readily.

The shaft 9 as is shown in Figs. 1, 6, and 8 is hollow in the forward end of which is inserted the hub of the gear 10 as shown in Fig. 1. The shaft is also longitudinally slotted on opposite sides as indicated at 19 and 20 and within this shaft is slidably mounted a key 21 which extends through both the slots 19 and 20 and is of a width preferably somewhat less than the length of the hub of the gear. This key 21 is provided with a shank 22 slidably fitting the interior of the shaft 9 and is provided at the outer end with an operating handle 23 shown particularly in Figs. 5 and 7 which is attached to a collar 24 rotatably mounted upon a terminal portion 25 of the shaft or shank 22. This collar allows rotative movement of the handle without rotation of the shank 22 which is prevented from rotation by reason of the key member extending through the slots of the shaft 9. This handle projects outwardly through an aperture 26 in the housing 50 for the shaft end and this aperture 26 has on the lower side thereof notches 27 corresponding in spacing to the spacing of the gears 5, 7 and 8. Thus, by movement of the handle from one notch to the other the key member 21 is moved from engagement with one gear to engagement with another and when so engaged with any one of the said gears will drive the shaft 9 and the load shaft connected therewith as will be readily understood. By cutting back the faces of the hubs of the gears as heretofore described the key 21 readily enters the keyways provided in the gear hubs without particular clash. Should the key be moved against the hub of any one of the gears during its rotation it may, of course, be moved at a time when a pair of the keyways are exactly in position to receive the key member. If the key be presented against the hub of the gear at a point between the pairs of keyways then, by reason of the base of the hub being cut back in the manner described the key naturally rides in position to engage the respective keyways. All the gears 6, 7 and 8 rotate in the same direction and thus the hubs are cut back in a manner to permit the key to ride downward on the inclined faces of the same into the keyways at the bottom of the inclination.

In the case of necessity of use of the reverse gear, I provide a sprocket wheel 30 on the driving shaft 1 and a similar wheel 31 on the shaft 9 and these sprocket wheels may be positioned at either end of the casing and are here shown as being positioned adjacent the driving end of the shaft 9. These gears 30 and 31 are connected together by means of a chain 32 and the gear 31 is provided with a hub having keyways similar to those of the gears 6, 7 and 8 shown in Fig. 2 to permit introduction of the key thereinto. Thus, the key 21 may be moved from engagement with the hub of the gear 6 into engagement with the hub of the sprocket 31 thus fixedly connecting the sprocket with the shaft 9 and driving the shaft in a reverse direction from that of the gears 6, 7 or 8.

It is to be noted that, when the gear 31 is moving, it is moving in a direction opposite to that of the gear 6 for instance and thus the face of the hub of the gear 31 should be cut with inclined surfaces extending in the opposite direction to that of the gear 6 to permit the ready insertion of the key member 21 thereinto.

By the above description it is evident that the device is simple and inexpensive in character and a power transmission device is provided in which the gears are all continuously in mesh and that any of the gears may be locked to the driving shaft at will and in operation of the key member it must pass through each of the hubs in changing from the lowest to the highest speeds. It is further evident that the device may be made of various sizes and various proportions.

Having thus fully described my invention, what I claim and desire to secure by Letters Patent of the United States is—

1. A speed-changing power transmission device comprising a driving shaft having a series of gears rotatable therewith, a driven shaft having gears rotatably mounted thereon each being in mesh with a complemental gear on the driving shaft, tubular members extending between the hubs of the gears of the driven shaft holding the same in spaced relation, said driven shaft having a slot and the driven gears each having keyways in the surface contacting the shaft adapted to be engaged by the key, the hub ends of said gears having a series of inclined portions each terminating at a keyway, a key extending through the slot of the shaft to engage the gear hub, the said inclined faces leading the key to the keyway, and means for moving the key longitudinally of the shaft from one gear to the other.

2. A speed-changing power transmission device comprising a driving shaft having a series of gears rotatable therewith, the gears being of different diameters, a driven shaft having gears rotatably mounted thereon and meshing with a companion driving shaft gear, said shaft being hollow and having oppositely disposed slots, said driven shaft gears having a plurality of oppositely disposed keyways formed in the hubs thereof and extending through the hub from one end to the other, each face of each hub having inclined portions at an angle to the plane of the wheel terminating at a keyway, a key member having a shank slidably fitting the hollow shaft and extending through the said slots, the inclined faces of the hubs due to the rotation of the gears leading the key to a keyway, means for holding the key member in engagement with a keyway of any of the said gears.

3. In a power transmission mechanism, the combination with a driving gear, a driven gear, a shaft on which the said driven gear is rotatably mounted, said shaft being hollow and provided with a slot, a key movable in the shaft and extending through the slot, said gear having a series of keyways in the hub and the hub end having a series of inclined faces extending at an angle to the plane of the wheel terminating at a keyway whereby on movement of the key to engage the hub, the inclined face guides the key to the keyway.

4. A speed-changing power transmission device including a driving and driven shaft, a series of gears of different diameters fixed to rotate with the driving shaft, a series of complemental gears being continuously in mesh therewith rotatably mounted on the driven shaft, a casing inclosing the said gears providing bearings for the shafts, a gear on one end of the driven shaft exteriorly of the casing, a housing for the opposite end of the shaft secured to the casing, the said driven shaft being hollow in form and having slots cut through diametrically opposite sides thereof, a key member having a length substantially equal to the length of the hubs of the gears, the said gears having keyways formed therein, the key member extending through the slots to position to engage in the keyways, a shank for the said key member slidably fitting the hollow shaft and extending into the housing, the housing having an elongated aperture formed therein, one side of the aperture being provided with notches spaced a distance equal to the spacing of the said gears, and a handle member oscillatably mounted upon the end of the said shank and extending through the slot of the housing by means of which the key may be moved in the shaft and positioned to engage the respective gear.

In testimony whereof I sign this application.

MARCELLIN POUGET.